Patented Sept. 19, 1933

1,927,813

UNITED STATES PATENT OFFICE 1,927,813

PROCESS OF ACCELERATING THE PRODUCTION OF BUTYRIC ACID BY FERMENTATION

David A. Legg, Terre Haute, Ind., and Hugh R. Stiles, Madison, Wis., assignors to Commercial Solvents Corporation, Terre Haute, Ind., a corporation of Maryland No Drawing. Application October 3, 1928
Serial No. 310,179

6 Claims. (Cl. 260—120)

The present invention relates to a process for the acceleration of butyric acid fermentation by the use of certain organisms that increase the chemical activity of the organisms primarily causing the fermentation.

It is known that the production of propionic acid and acetic acid from carbohydrates and salts of organic acids by use of organisms of the type of *Bacterium acidi propionici* may be accelerated by the presence of certain other organisms which do not produce propionic acid themselves. In inoculation with a propionic organism, an accelerating organism may be introduced by an additional inoculation, or the accelerating organism may be introduced by having it already growing in the same culture with the inoculation propionic organism.

It has now been discovered that butyric fermentation may be carried on in a similar manner, and that this fermentation by the use of organisms of the type of *Bacillus saccharobutyricum liquefaciens* may be accelerated by the presence of certain other organisms which do not produce butyric acid themselves; and as in the prior case, in inoculation with a butyric organism, an accelerating organism may be introduced by an additional inoculation, or the accelerating organism may be introduced by having it already growing in the same culture with the inoculating butyric organism.

These accelerating organisms are substantially included in the following classes, but this statement is not to be construed as limiting the operation of this invention to the use of organisms of the classes specifically named: 1. Those organisms which produce lactic acid from carbohydrates, as for example, those described on pages 241–255 of Bergey's Manual of Determinative Bacteriology (1923 edition); 2. Organisms which do not produce lactic acid from carbohydrates, but which hydrolyze nitrogenous substances and form therefrom new materials which can be acted upon by other bacteria, such as the members of the Proteus group (pages 209–211 of Bergey's Manual of Determinative Bacteriology); 3. Organisms which do not fall into either of the preceding groups but which ferment salts of organic acids, such as the members of the Alcaligines group (pages 233–235 of Bergey's Manual of Determinative Bacteriology).

Although the organisms discussed above naturally fall into the three groups specified, it is not to be understood that all of the properties of these organisms are mutually exclusive. For example, some of the organisms falling in group 3 and described in Bergey's manual at the pages cited may truly be said not to fall into the other two groups although they have, to a limited extent at least, some of the properties of the other organisms. For example, some of the members of the Alcaligines group will liquefy gelatin and some will proteolyze milk to a limited extent. However, they are not strongly proteolytic and will be recognized by anyone skilled in the art to fall outside of the Proteus group.

This invention is therefore based upon the discovery that butyric acid bacteria, such as *Bacillus saccharobutyricum liquefaciens*, can be grown together with lactic acid bacteria, as for example, *Lactobacillus casei* or other suitable bacteria of the type specified above, on carbohydrate substrata, such as ten per cent molasses solution, to give a higher yield of volatile acids than the same media inoculated only with the butyric acid bacteria will give. The following example illustrates the procedure and the results obtainable by this process.

*Bacillus saccharobutyricum liquefaciens* was grown for 48 hours in tubes of beef—peptone—glucose media with excess calcium carbonate, and then transferred to flasks containing 500 c.c. of the same media. Inoculum of *Lactobacillus casei* equal to approximately ten per cent of the butyric inoculum was also added. After incubating for 48 hours, the flasks were used to inoculate three liters of ten per cent molasses solution containing one per cent tankage and an excess of calcium carbonate, e. g., calcite. At the end of seven days there was a concentration of 2.1 per cent of volatile acids consisting principally of butyric acid, as compared with 1.64 per cent volatile acids with *B. saccharobutyricum liquefaciens* alone.

It will be understood that the invention is not intended to be limited by the above specific illustrative example, but that it is desired to embrace within the scope of this invention, such modifications and changes as may be necessary to adapt it to varying conditions and uses. For example, in place of *Bacillus saccharobutyricum liquefaciens*, we may employ other butyric acid-liquefaciens, we may employ other butyric acid-forming organisms such as those listed on pages 320–321 of Bergey's Manual of Determinative Bacteriology (1923 edition). In addition to molasses, we may employ, as the raw material for our fermentation process, other carbohydrate-containing materials such as lactose, saccharified corn mash, "hydrol syrup", etc. Certain of the raw materials commonly used for fermentation purposes are deficient in nutrients. In such cases we have found it advisable to add to the mash, nutrient materials in sufficient quantity to promote optimum growth of the bacteria. It is well known, also, that the activity of acid-forming organisms decreases after a short time unless the acid formed is continually removed by the aid of neutralizing agents or other means, and it is understood that our invention covers the employment of such commonly used expedients.

What is claimed is:—

1. The process of increasing the rate of production of butyric acid from carbohydrates which comprises fermenting the said carbohydrates by butyric bacteria in the presence of lactic acid-producing organisms.

2. The process of increasing the rate of production of butyric acid from carbohydrates which comprises fermenting the carbohydrates by butyric bacteria in the presence of other organisms which do not produce lactic or butyric acids from carbohydrates but which hydrolyze nitrogenous substances.

3. The process of increasing the rate of production of butyric acid from carbohydrates which comprises fermenting carbohydrates by butyric bacteria in the presence of other bacteria which neither produce substantial amounts of lactic acid from carbohydrates nor are essentially proteolytic in nature but which decompose salts of organic acids.

4. The process of increasing the rate of production of butyric acid from carbohydrates which comprises fermenting the said carbohydrates by the action of organisms of the type of *Bacillus saccharobutyricum liquefaciens* in the presence of *Lactobacillus casei*.

5. The process of increasing the chemical activity of butyric bacteria of the type of *Bacillus saccharobutyricum liquefaciens* which comprises culturing the organisms in the presence of *Lactobacillus casei*.

6. The process of increasing the rate of production of butyric acid from carbohydrates which comprises fermenting carbohydrates by butyric bacteria in the presence of organisms of the group consisting of lactic acid-producing organisms, organisms which hydrolize nitrogenous substances and organisms which neither produce substantial amounts of lactic acid from carbohydrates nor are essentially proteolytic in nature but which decompose salts of organic acids.

DAVID A. LEGG.
HUGH R. STILES.